(12) United States Patent
Al Mahmood et al.

(10) Patent No.: US 12,461,906 B2
(45) Date of Patent: *Nov. 4, 2025

(54) FILE-BASED ERROR HANDLING DURING INGESTION WITH TRANSFORMATION

(71) Applicant: Snowflake Inc., Bozeman, MT (US)

(72) Inventors: Abdullah Al Mahmood, Bothell, WA (US); Ruta Dhaneshwar, Redmond, WA (US); Max Heimel, Berlin (DE); Xin Huang, Bellevue, WA (US); Canzhou Qu, Bellevue, WA (US); Purav B. Saraiya, Kirkland, WA (US); Konstantinos Zoumpatianos, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,063

(22) Filed: Nov. 5, 2024

(65) Prior Publication Data

US 2025/0061107 A1    Feb. 20, 2025

Related U.S. Application Data

(63) Continuation of application No. 18/321,994, filed on May 23, 2023, now Pat. No. 12,169,486.

(60) Provisional application No. 63/380,163, filed on Oct. 19, 2022.

(51) Int. Cl.
G06F 16/23    (2019.01)
G06F 16/215    (2019.01)
G06F 16/25    (2019.01)

(52) U.S. Cl.
CPC ........ *G06F 16/2365* (2019.01); *G06F 16/215* (2019.01); *G06F 16/258* (2019.01)

(58) Field of Classification Search
None
See application file for complete search history.

(56) References Cited

U.S. PATENT DOCUMENTS

2011/0295865 A1    12/2011    Carroll et al.
2016/0328610 A1    11/2016    Thompson et al.
2016/0364434 A1    12/2016    Spitz et al.
2024/0134844 A1    4/2024    Al Mahmood et al.

OTHER PUBLICATIONS

"U.S. Appl. No. 18/321,994, Notice of Allowance mailed Aug. 5, 2024", 11 pgs.

*Primary Examiner* — Eddy Cheung
(74) *Attorney, Agent, or Firm* — Schwegman Lundberg & Woessner, P.A.

(57) ABSTRACT

A data platform including an error handling framework for loading of input data. The data platform generates input data columns based on an input file and generates result data columns based on the input data columns and evaluating expressions. The data platform detects projection errors during the generating of the result data columns and stores result error indicators in error indicator arrays of the result data columns based on the projection errors. The data platform generates filtered result data columns based on the result data columns and the result error indicator arrays of the result data columns and stores the filtered result data columns in a database of the data platform.

30 Claims, 7 Drawing Sheets

FILE-BASED ERROR HANDLING DURING INGESTION WITH TRANSFORMATION

PRIORITY CLAIM

This application is a Continuation of U.S. patent application Ser. No. 18/321,994, filed May 23, 2023, which claims the benefit of priority to U.S. Provisional Patent Application Ser. No. 63/380,163, filed Oct. 19, 2022, the contents of which are incorporated herein by reference in their entireties.

TECHNICAL FIELD

Examples of the disclosure relate generally to databases and, more specifically, to error handling while populating a database from an external file.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Providers of data on a data platform may desire a way to conveniently populate their databases.

BRIEF DESCRIPTION OF THE DRAWINGS

The present disclosure will be understood more fully from the detailed description given below and from the accompanying drawings of various examples of the disclosure.

DETAILED DESCRIPTION

Users of database platforms input data into the platform in a variety of modes. One mode is for a data platform to ingest input data from an input file that contains formatted input data. During a data ingestion process, a data platform parses or scans the input file to identify the values in the formatted data, processes the values, and inserts the values into a database. During the data ingestion process, errors can occur during one or more operations of the data ingestion process. For example, during a scanning operation, there may be errors in the formatting of the data. In subsequent operations, such as an expression evaluation, an input value may cause an error in the expression evaluation. Therefore, efficient error handling includes capabilities to detect a variety of errors within a variety of operations. Such error handling should facilitate consistent error handling behavior across all file format types and implement a common method to deal with transformation so that the supported set of functions is defined consistently for all supported file formats.

In some examples, with the presence of a consistent and more generic expression error handling mechanism, it is possible to implement error handling for copy and other operations without relying on customized error handling logic baked into a subset of SQL function implementations.

In some examples, users are afforded control over file-based error handling during ingesting of their data into a data platform. In some examples, an ingestion process provides similar levels of error handling for ingesting a variety of types of files.

In some examples, an ingestion process is extendable to include several types of Standard Query Language (SQL) queries if needed.

In some examples, a data platform generates one or more input data columns, each input data column includes an input value array of one or more input values, based on one or more input files. The data platform generates one or more result data columns, each result data column includes one or more result value arrays and one or more result error indicator arrays, based on the input data columns and one or more expressions. The data platform detects one or more projection errors during the generating of the one or more result data columns and stores a result error indicator in the one or more error indicator arrays of the one or more result data columns based on the one or more projection errors. The data platform generates one or more filtered result data columns based on the one or more result data columns and the one or more result error indicator arrays of the one or more result data columns and stores the one or more filtered result data columns in a database of the data platform.

In some examples, the data platform generates file statistic data during the generating of the one or more input data columns.

In some examples, the one or more input data columns further comprise an error indicator array of one or more error indicators corresponding to the input value array. The data platform detects one or more input errors during the generating of the one or more input data columns and stores the one or more input error indicators in the one or more error indicator arrays of the one or more input data columns based on the one or more input errors.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

Figure 1:
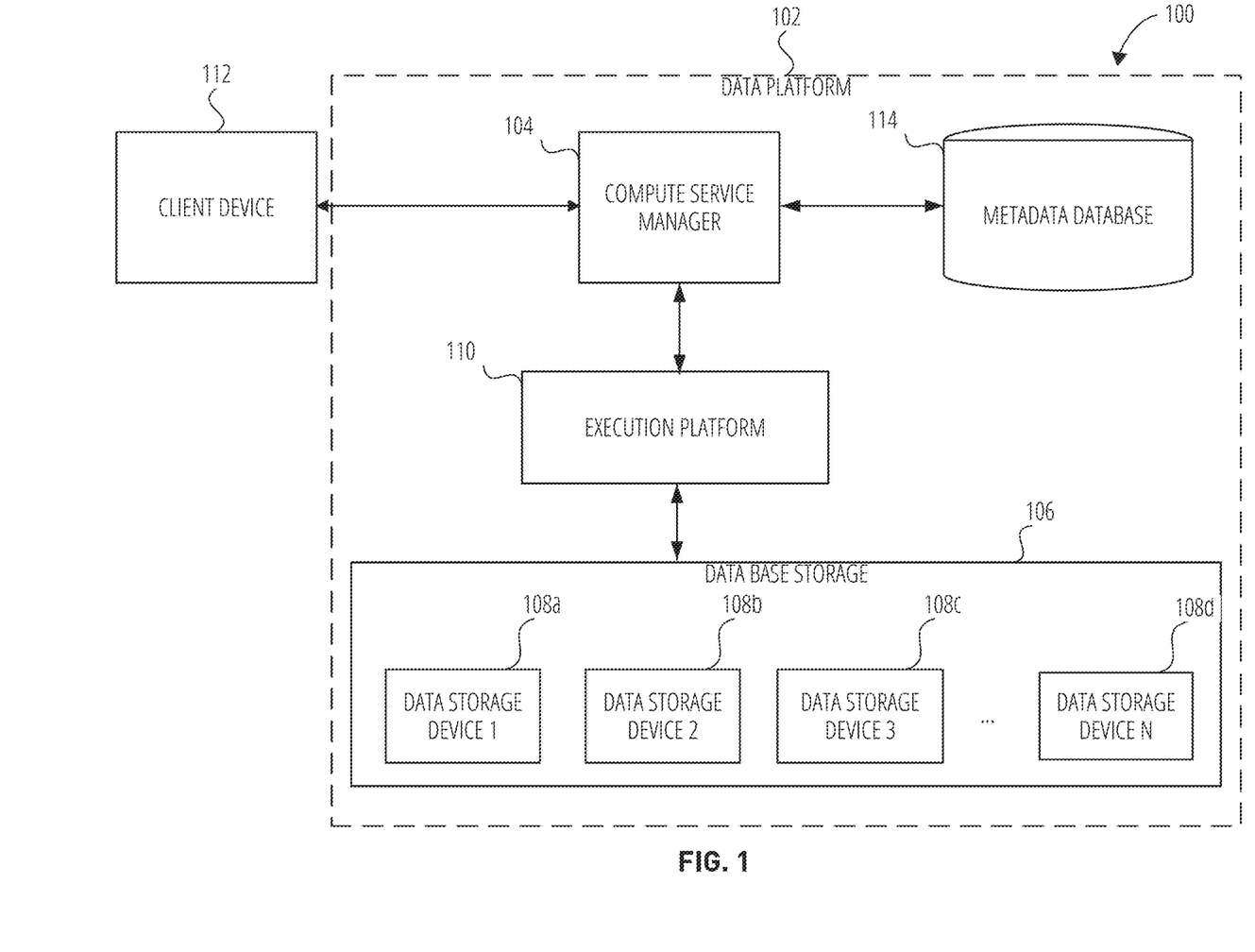
FIG. 1 illustrates an example computing environment that includes a network-based data platform in communication with a cloud storage provider system, in accordance with some examples of the present disclosure.

FIG. 1 illustrates an example computing environment 100 that includes a data platform 102 in communication with a client device 112, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a database storage 106, a compute service manager 104, an execution platform 110, and a metadata database 114. The database storage 106 comprises a plurality of computing machines and provides on-demand computer system resources such as data storage and computing power to the data platform 102. As shown, the database storage 106 comprises multiple data storage devices, namely data storage device 1 108a to data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the database storage 106 may include distributed file systems (e.g., Hadoop Distributed File Systems (HDFS)), object storage systems, and the like. The data platform 102 is used for reporting and analysis of integrated data from one or more disparate sources including the storage devices 1 to N within the database storage 106. The data platform 102 hosts and provides data reporting and analysis services to multiple customer accounts. Administrative users can create and manage identities (e.g., users, roles, and groups) and use privileges to allow or deny access to the identities to resources and services. Generally, the data platform 102 maintains numerous customer accounts for numerous respective customers. The data platform 102 maintains each customer account in one or more storage devices of the database storage 106. Moreover, the data platform 102 may maintain metadata associated with the customer accounts in the metadata database 114. Each customer account includes multiple data objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple customer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. Additionally, the metadata database 114 may include information regarding how data is organized in remote data storage systems (e.g., the database storage 106) and the local caches. The metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. In some examples, the compute service manager 104 communicates with the execution platform 110 concerning jobs and tasks using a queue within the data platform 102. This isolates the operations of the execution platform 110 and the client device 112. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and database storage 106 are shown in FIG. 1 as individual discrete components. However, each of the compute service manager 104, metadata database 114, execution platform 110, and database storage 106 may be implemented as a distributed system (e.g., distributed across multiple systems/platforms at multiple geographic locations). Additionally, each of the compute service manager 104, metadata database 114, execution platform 110, and database storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is used to execute each of the multiple discrete tasks. The compute service manager 104 may assign each of the multiple discrete tasks to one or more nodes of the execution platform 110 to process the task. The compute service manager 104 may determine what data is used to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the database storage 106. It is desirable to retrieve as much data as possible from caches within the execution platform 110 because the retrieval speed is typically faster than retrieving data from the database storage 106.

As shown in FIG. 1, the computing environment 100 separates the execution platform 110 from the database storage 106. In this arrangement, the processing resources and cache resources in the execution platform 110 operate independently of the database storage devices data storage device 1 108a to data storage device N 108d in the database storage 106. Thus, the computing resources and cache resources are not restricted to a specific one of the data storage device 1 108a, data storage device 2 108b, and data storage device 3 108c to data storage device N 108d. Instead, computing resources and cache resources may retrieve data from, and store data to, any of the data storage resources in the database storage 106.

Figure 2:
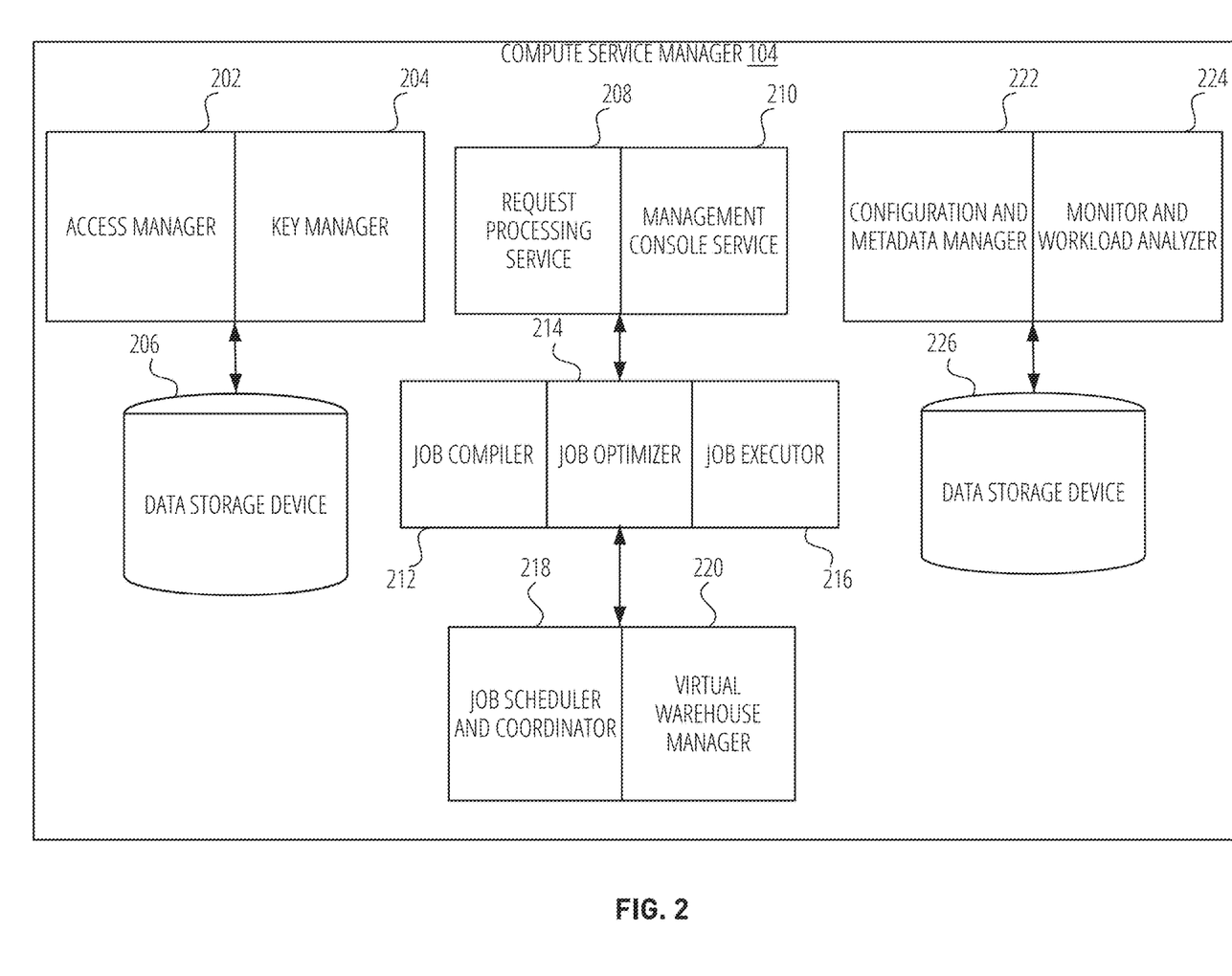
FIG. 2 is a block diagram illustrating components of a compute service manager, in accordance with some examples of the present disclosure.

FIG. 2 is a block diagram illustrating components of the compute service manager 104, in accordance with some examples of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in database storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in database storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines a method to execute the multiple discrete tasks based on the data being processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions are to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in database storage 106, or any other storage device.

Figure 3:
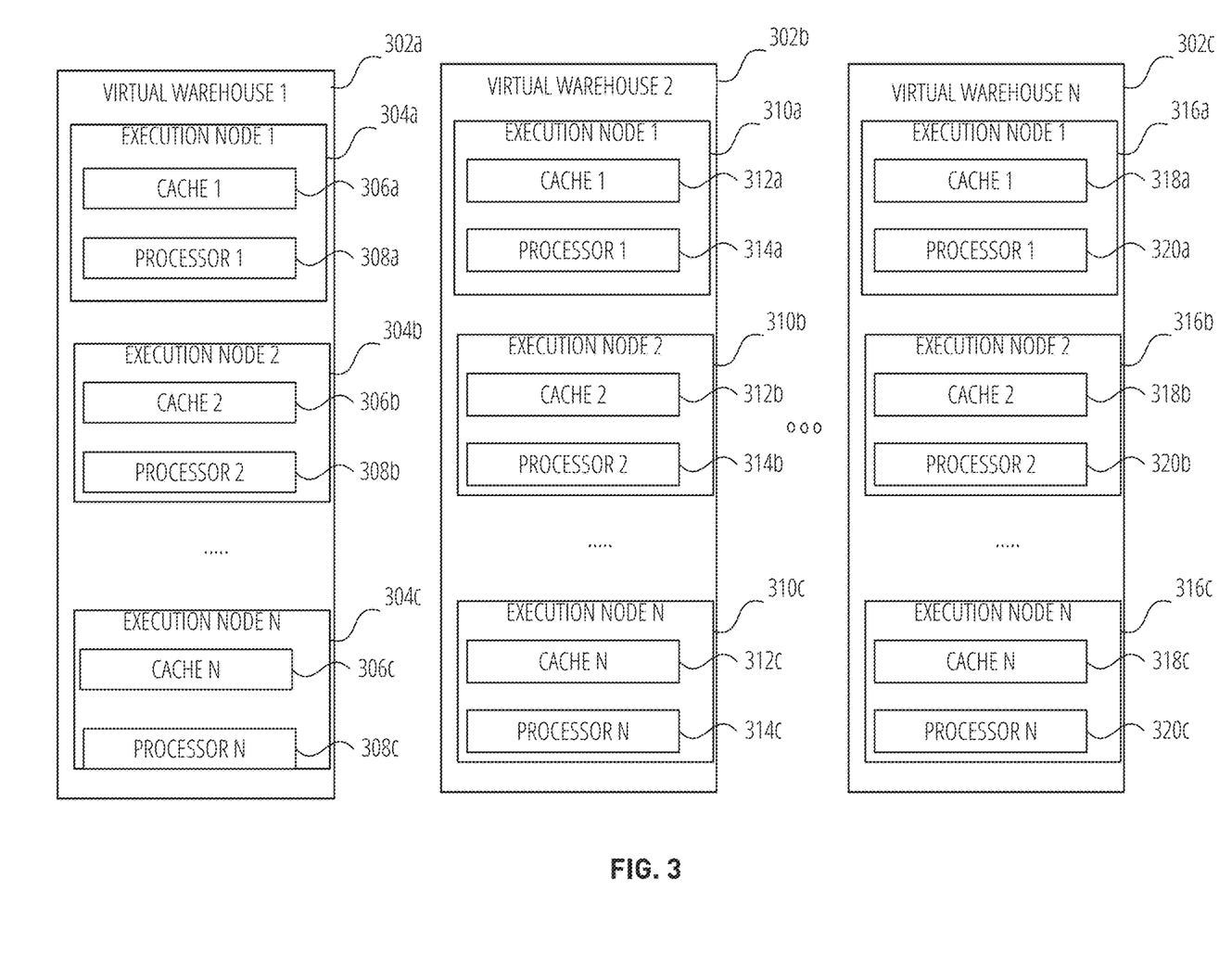
FIG. 3 is a block diagram illustrating components of an execution platform, in accordance with some examples of the present disclosure.

The compute service manager 104 validates communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may communicate with another execution node (e.g., execution node 2 304b), while being disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram illustrating components of the execution platform 110, in accordance with some examples of the present disclosure. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. The virtual warehouses can access data from any data storage device (e.g., any storage device in database storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the database storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 310a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in database storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the database storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in database storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
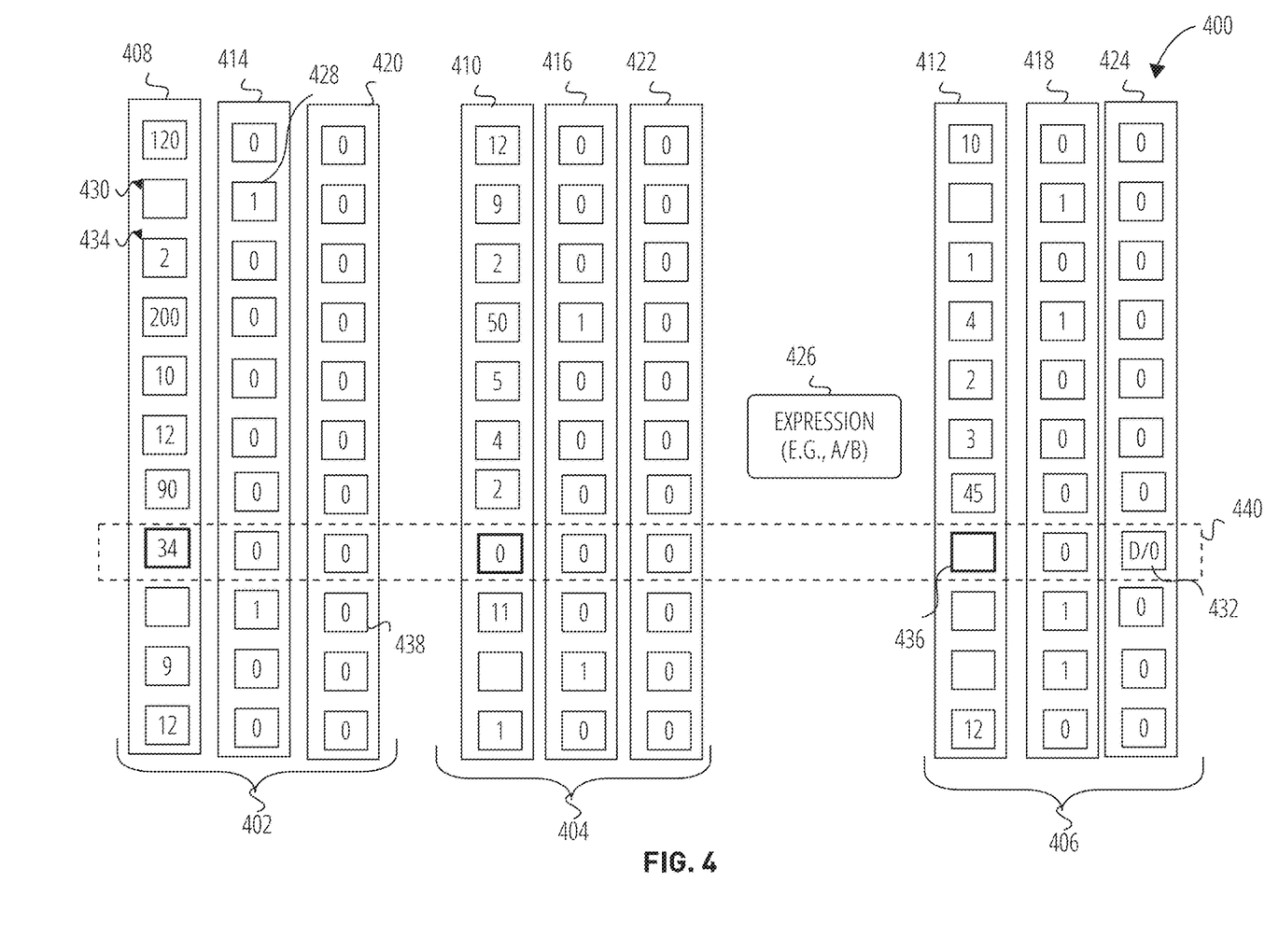
FIG. 4 is an illustration of an error handling framework, in accordance with some examples of the present disclosure.

FIG. 4 is an illustration of an error handling framework, in accordance with some examples. A data ingestion query pipeline, such as data ingestion query pipeline 528 of FIG. 5B, reads data into a database and decouples error handling from one or more scanner components using a generic expression error handling framework 400 having one or more error indicators representing information about errors and an explicit error indicator array.

Example input data includes an input data column A 402 and an input data column B 404. Input data column A 402 includes input value array 408 comprising one or more rows containing values, such as value row 434. Although represented in the example as integers, values stored in the rows can be of any database value type suitable for storage in a database such as, but not limited to, text data, integers, floating point numbers, complex data structures, documents, and the like. In a similar manner, input data column B 404 includes an input value array 410 also containing values and a result data column 406 includes a result value array 412.

Each column is associated with a null indicator vector, such as input null indicator vector 414, input null indicator vector 416, and result null indicator vector 418, that marks rows in a value array that are null or empty and contain no value. For example, input null indicator vector 414 includes a null indicator 428 indicating that there is an empty value row 430 in the input value array 408.

Each column is also associated with an error indicator array, such as input error indicator array 420, input error indicator array 422, and result error indicator array 424. An entry in an error indicator array indicates that a corresponding value in a value column is erroneous. For example, result error indicator array 424 has an error indicator 432 indicating that a division by zero error has occurred and any value in value row 436 is erroneous.

Expressions, such as expression 426, operate on one or more columns, such as input data column A 402 and input data column B 404. Expressions receive a set of columns as input, compute an expression based on the values in the set of rows (rowsets) of the set of columns and return a resulting column as output, such as result data column 406. Expression implementations read a row at a time from one or more input value arrays, such as input value array 408 and input value array 410, and compute a result value array, such as result value array 412 of a result column, such as result data column 406. The result data column 406 comprises a result value array 412 containing computed values, a result null indicator vector 418 containing null indicators indicating that corresponding rows of the result value array 412 do not contain a value, and a result error indicator array 424 containing error indicators indicating whether a corresponding row of the result value array 412 contains an erroneous value. In the example, an example mathematical operation of the expression, namely division, is illustrated, however it is to be understood that expressions may include any type of operation that may operate on any type of database value column containing any type of database value.

In some examples, a data ingestion query pipeline decouples error handling from one or more scanner components using a generic expression error handling framework having one or more error indicators used to represent information about errors and an explicit error indicator array. When an error occurs during computation, e.g., division by zero, an error is indicated by storing an error indicator 432, in the result error indicator array 424 at a row in the result error indicator array 424 corresponding to a row in the result value array 412 containing an erroneous value, such as value row 436. In some examples, the encountered error is specified in the result error indicator array 424 as exemplified by the text entry "DIV 0" indicating that a division by zero has been attempted.

For example, in reference to FIG. 4, example input data includes input data column A 402 and an input data column B 404. Input data column A 402 includes input value array 408 comprising one or more rows containing values, such as value row 434. Although represented in the example as integers, values stored in the rows can be of any database value type suitable for storage in a database such as, but not limited to, text data, integers, floating point numbers, complex data structures, documents, and the like.

Each column is associated with a null indicator vector, such as input null indicator vector 414, input null indicator vector 416, and result null indicator vector 418, which marks rows in a value array that are null or empty and contain no value. For example, input null indicator vector 414 includes a null indicator 428 indicating that there is an empty value row 430 in the input value array 408.

Each column is also associated with an error indicator array, such as input error indicator array 420, input error indicator array 422, and result error indicator array 424. An entry in an error indicator row 438 of an error indicator array indicates that a corresponding value in a value column is erroneous. For example, result error indicator array 424 has an error indicator 432 in an error indicator row indicating that a division by zero error has occurred and any value in value row 436 is erroneous.

Expressions, such as expression 426, operate on one or more columns, such as input data column A 402 and input data column B 404. Expressions receive a set of columns as input, compute an expression based on the values in the rowsets of the set of columns and return a resulting column as output, such as result data column 406. Expression implementations read a row at a time from each column, and compute a result column, such as result data column 406. The result data column 406 comprises a result value array 412 containing computed values, a result null indicator vector 418 containing null indicators indicating that corresponding rows of the result value array 412 do not contain a value, and a result error indicator array 424 containing one or more error indicators indicating whether a corresponding row of the result value array 412 contains an erroneous value. In the example, an example mathematical operation of the expression, namely division, is illustrated, however it is to be understood that expressions may operate on any type of database value column containing any type of database value.

When an error occurs during computation, e.g., division by zero, an error is indicated, such as by error indicator 432, in the result error indicator array 424 at a row in the result error indicator array 424 corresponding to a row in the result value array 412 containing an erroneous value, such as value row 436. In some examples, the encountered error is specified in the result error indicator array 424 as exemplified by the text entry "DIV 0" indicating that a division by zero has been attempted.

Use of error indicators and error indicator arrays associated with value columns allows implementing error-specific strategies for error handling outside the boundary of a Row Set Operator (RSO) that performs an action on a rowset, such as the rows in input value array 408 and input value array 410. Error information is propagated from one RSO to another with the rowsets being passed. Instead of aborting execution of a set of RSOs on the first error being encountered, errors are indicated in one or more error indicator arrays associated with the columns of the rowsets and execution of the RSO that encountered the error continues with all rowsets being processed.

Figure 5A:
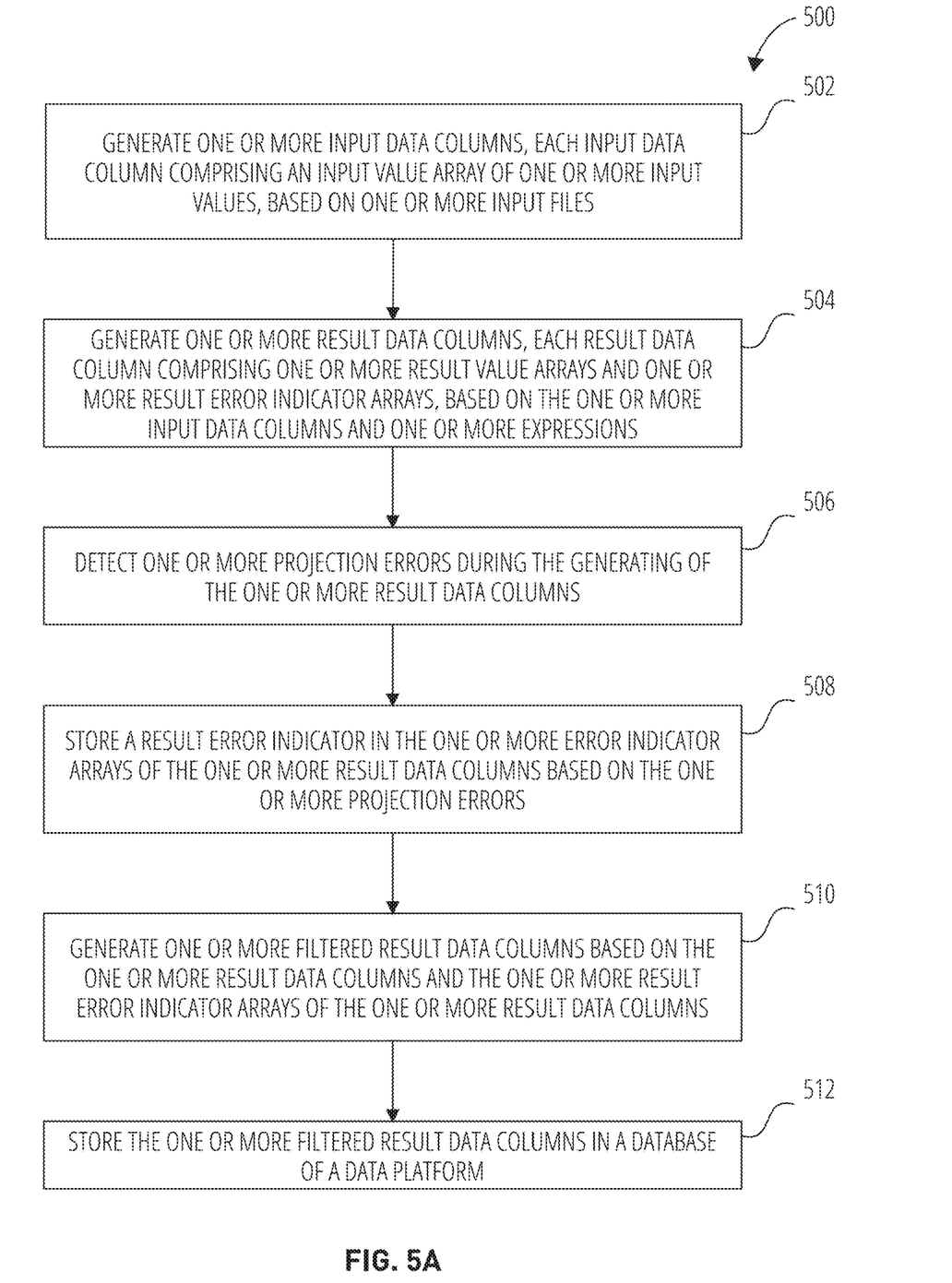
FIG. 5A illustrates a data ingestion process, in accordance with some examples of the present disclosure.
Figure 5B:
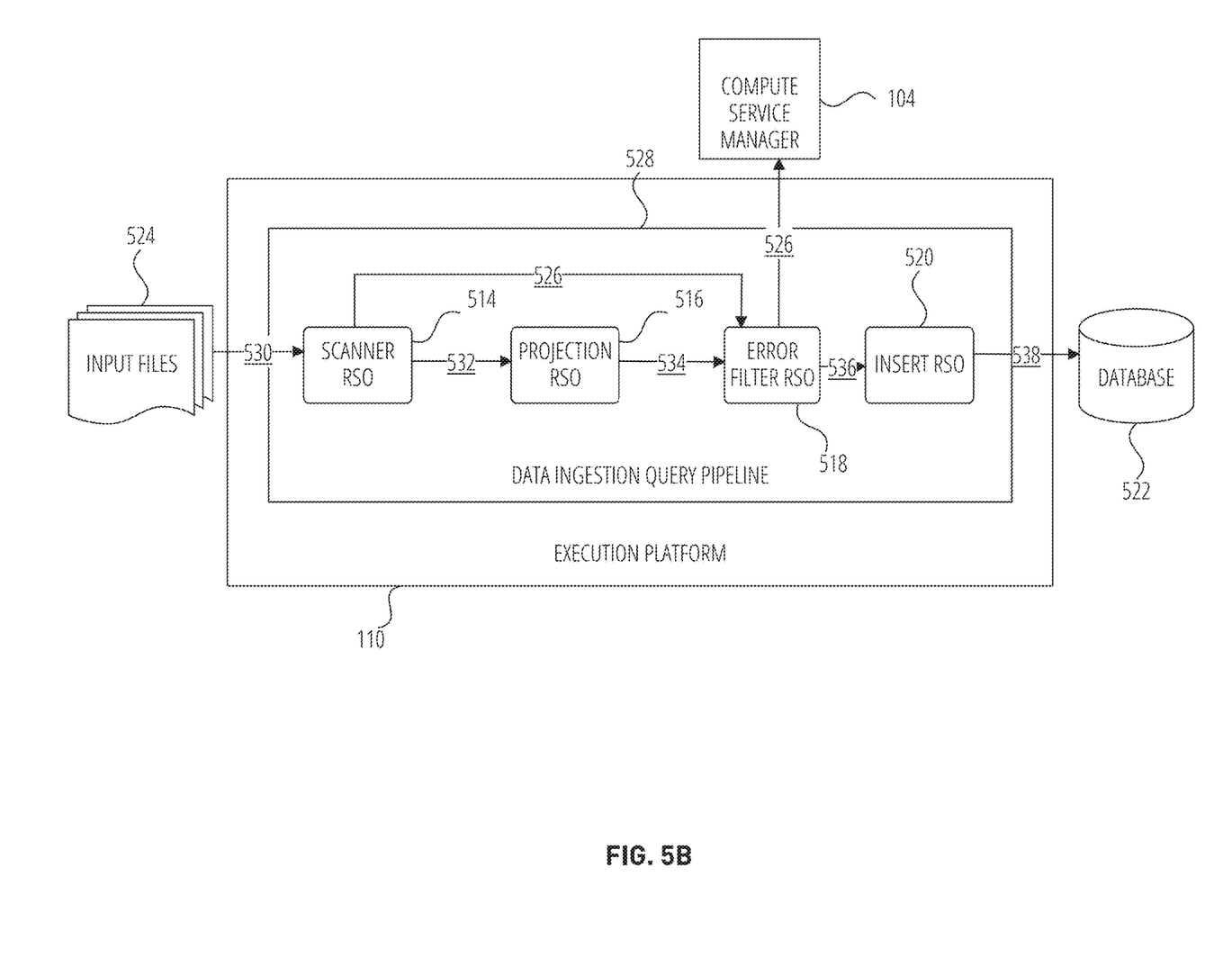
FIG. 5B is a diagram illustrating a data ingestion pipeline, in accordance with some examples of the present disclosure.

FIG. 5A is a data ingestion process and FIG. 5B is a diagram illustrating a data ingestion pipeline, in accordance with some examples. A data ingestion query pipeline 528 loads input data 530 from one or more input files 524 and inserts the input data 530 into a database 522 in accordance with a data ingestion process 500.

In operation 502, scanner RSO 514 reads input data 530 from one or more input files 524. The scanner RSO 514 generates one or more input data columns 532, each input data column comprising an input value array of one or more input values based on the input data 530. The scanner RSO 514 communicates data of the one or more input data columns 532 to a projection RSO 516. For example, the scanner RSO 514 reads in the input data 530 having one or more input values encoded in a specified file format such as, but not limited to, a Comma Separated Value (CSV) format, a JSON format, a Parquet format, an AVRO format, an ORC format, an XML format, or the like. The scanner RSO 514 parses the input data 530 to identify individual input values and creates one or more data columns and populates the data columns with the input values by placing the input values into one or more value rows in the input value arrays.

In some examples, the one or more input data columns 532 include one or more error indicator arrays of one or more error indicators corresponding to the one or more input value arrays of the one or more input data columns 532. The scanner RSO 514 detects one or more input errors during the generating of the one or more input data columns 532 and stores one or more input error indicators in the one or more error indicator arrays of the one or more input data columns 532 based on the one or more input errors. For example, during parsing of the input data 530 of the one or more input files 524, the scanner RSO 514 may detect an error in the formatting of the input data 530. The scanner RSO 514 traps the error and assigns to the error an identifying input error indicator. The scanner RSO 514 stores the input error indicator into the one or more input error indicator arrays at a position corresponding to an erroneous input value in the one or more input value arrays of the one or more input data columns 532.

In operation 504, the projection RSO 516 receives the data of the one or more input data columns 532 and generates one or more result data columns 534, each result data column comprising one or more result value arrays and one or more result error indicator arrays based on the one or more result data columns 534. The result data columns 534 are generated based on the input data columns 532 and one or more expressions. For example, the projection RSO 516 reads one or more rowsets comprising the value rows of the input value arrays of the input data columns 532 and performs one or more operations on the rowsets as specified in the one or more expressions. The projection RSO 516 generates one or more result data columns having one or more result value arrays and stores one or more result values resulting from the evaluation of the one or more expressions in the result value arrays of the one or more result data columns.

In operation 506, the projection RSO 516 detects one or more projection errors while generating the one or more result data columns 534. For example, an operation of an expression may cause a computational error to occur, e.g., a division by zero. The projection RSO 516 detects that the projection error has occurred and traps the projection error.

In operation 508, the projection RSO 516 stores a result error indicator in the one or more error indicator arrays of the one or more result data columns 534 based on the one or more projection errors. For example, the projection error may be a computational error created by an attempted operation on a rowset. The type of the error is trapped and encoded into an error indicator. The error indicator is stored in a result error indicator array of the one or more result data columns 534 in a position in the result error indicator array that corresponds to the rowset that caused the computational error.

In operation 510, the error filter RSO 518 generates one or more filtered result data columns 536 based on the one or more result data columns 534 and the one or more result error indicator arrays of the one or more result data columns 534. For example, the error filter RSO 518 filters out erroneous rows of rowsets of the one or more result data columns 534 based on the one or more result error indicator arrays of the one or more result data columns 534 by deleting rowsets of the one or more result value arrays of the one or more result data columns 534 that correspond to a result error indicator stored on the one or more result error indicator arrays of the one or more result data columns 534. The error filter RSO 518 filters the one or more result data columns 534 before communicating the one or more result data columns 534 as one or more filtered result data columns 536 to an insert RSO 520. Using the error filter RSO 518 within the data ingestion query pipeline 528 allows the data ingestion query pipeline 528 to handle transformation errors and reduce a number of processing modules included in the scanner RSO 514 which are not directly related to scanning the one or more input files 524.

The error filter RSO 518 filters out erroneous rows within rowsets of the one or more result data columns 534 and maintains a local buffer to handle logic for different options for handling encountered errors ensuring that only appropriate rows are passed to an insert RSO 520 for loading into the database 522. In some examples, the error filter RSO 518 buffers errors until such time an error percentage can be determined for accepting or rejecting a file such that decisions are made inside the error filter RSO 518.

In some examples, error filter RSO 518's response to an error during evaluation of an expression 426 may depend upon a user's specified preference. For example, the data ingestion query pipeline 528 may be invoked by a "Copy into <table> . . . " command. The command instructs the data ingestion query pipeline 528 to load data from staged files to an existing table of a database. Users can specify a number of copy options to customize the functionality of the load operation. An ON_ERROR option allows users to decide what to do when an error is encountered while loading data from a file. The ON_ERROR supports a number of actions that are taken when an error is encountered including:
  ABORT_STATEMENT: Aborts the load operation if any error is encountered in a data file.
  CONTINUE: Continue loading the file.
  SKIP_FILE: Skip file if any errors encountered in the file.
  SKIP_FILE_N: Skip file based on the number of errors satisfying a threshold constraint. For example, satisfying a threshold constraint may include determining that the number of errors exceeds a threshold number of errors in the file.
  SKIP_FILE_X %: Skip file based on the percentage of errors satisfying a threshold constraint. For example, satisfying a threshold constraint may include determining that the percentage of errors exceeds a threshold percentage of errors.
This option is very useful and gives a unique advantage to Copy over other methods for ingesting data from external files.

In some examples, a user may provide a customized error handling function to the error handling framework 400 for handling errors generated during evaluation of an expression or during other stages of a data loading process.

In operation 512, error filter RSO 518 communicates the one or more filtered result data columns 536 to the insert RSO 520. The insert RSO 520 receives the filtered result data columns 536 and stores data of the result values 538 of the one or more filtered result data columns 536 in a database 522 of the data platform 102.

In some examples, the scanner RSO 514 tracks external file statistic data 526 used for load history calculation. The file statistic data 526 is sent from an execution platform 110 executing the processes of the data ingestion query pipeline 528 to a compute service manager 104 (of FIG. 1) of a data platform 102 (of FIG. 1). As the scanner RSO 514 opens the external one or more input files 524 and scans them, none of the other RSOs of the data ingestion query pipeline 528 have context about the external one or more input files 524. However, the scanner RSO 514 also does not have information about subsequent processing of the input data columns 532 extracted from the one or more input files 524. Accordingly, the scanner RSO 514 communicates file statistic data 526 to the error filter RSO 518. The error filter RSO 518 communicates the file statistics to the compute service manager 104. The file statistic data 526 contains external file row statistics including parsing error information (if any). The file statistic data 526 also functions as a signal for the error filter RSO 518 to indicate an external input file that the current rowsets the error filter RSO 518 is processing came from and if the scanner RSO 514 is at the end of processing that file. Upon receiving this signal error filter RSO 518 completes any calculations to gather all the files statistics in the file statistic data 526 and send it to the compute service manager 104.

Although the example data ingestion process 500 depicts a particular sequence of operations using a particular set of components of the data platform 102, the sequence or the components may be altered without departing from the scope of the present disclosure. For example, some of the operations depicted may be performed in parallel or in a different sequence that does not materially affect the function of the data ingestion process 500. In other examples, different components of an example device or system that implements the data ingestion process 500 may perform functions at substantially the same time or in a specific sequence.

Figure 6:
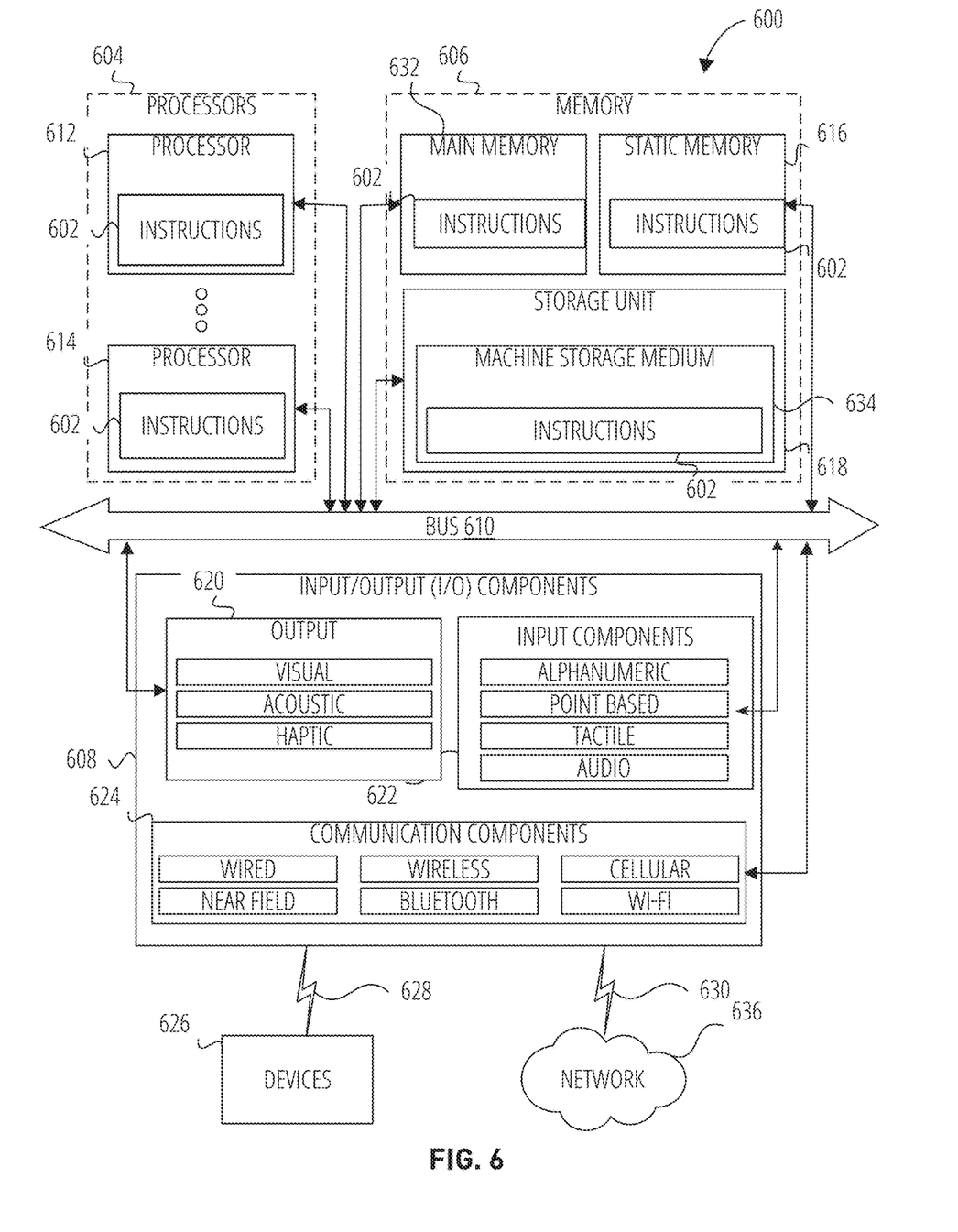
FIG. 6 illustrates a diagrammatic representation of a machine in the form of a computer system within which a set of instructions may be executed for causing the machine to perform any one or more of the methodologies discussed herein, in accordance with some examples of the present disclosure.

FIG. 6 illustrates a diagrammatic representation of a machine 600 in the form of a computer system within which a set of instructions may be executed for causing the machine 600 to perform any one or more of the methodologies discussed herein, according to examples. Specifically, FIG. 6 shows a diagrammatic representation of the machine 600 in the example form of a computer system, within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more operations of any one or more of the methods described herein. In this way, the instructions 602 transform a general, non-programmed machine into a particular machine 600 (e.g., the compute service manager 104, the execution platform 110, and the data storage devices 1 to N of database storage 106) that is specially configured to carry out any one of the described and illustrated functions in the manner described herein.

In alternative examples, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 602, sequentially or otherwise, that specify actions to be taken by the machine 600. Further, while only a single machine 600 is illustrated, the term "machine" shall also be taken to include a collection of machines that individually or jointly execute the instructions 602 to perform any one or more of the methodologies discussed herein.

The machine 600 includes processors 604, memory 606, and I/O components 608 configured to communicate with each other such as via a bus 610. In some examples, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 612 and a processor 614 that may execute the instructions 602. The term "processor" is intended to include multi-core processors that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 may include a main memory 632, a static memory 616, and a storage unit 618 including a machine storage medium 634, accessible to the processors 604 such as via the bus 610. The main memory 632, the static memory 616, and the storage unit 618 store the instructions 602 embodying any one or more of the methodologies or functions described herein. The instructions 602 may also reside, completely or partially, within the main memory 632, within the static memory 616, within the storage unit 618, within at least one of the processors 604 (e.g., within the processor's cache memory), or any suitable combination thereof, during execution thereof by the machine 600.

The input/output (I/O) components 608 include components to receive input, provide output, produce output, transmit information, exchange information, capture measurements, and so on. The specific I/O components 608 that are included in a particular machine 600 will depend on the type of machine. For example, portable machines such as mobile phones will likely include a touch input device or other such input mechanisms, while a headless server machine will likely not include such a touch input device. It will be appreciated that the I/O components 608 may include many other components that are not shown in FIG. 6. The I/O components 608 are grouped according to functionality merely for simplifying the following discussion and the grouping is in no way limiting. In various examples, the I/O components 608 may include output components 620 and input components 622. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 608 may include communication components 624 operable to couple the machine 600 to a network 636 or devices 626 via a coupling 630 and a coupling 628, respectively. For example, the communication components 624 may include a network interface component or another suitable device to interface with the network 636. In further examples, the communication components 624 may include wired communication components, wireless communication components, cellular communication components, and other communication components to provide communication via other modalities. The devices 626 may be another machine or any of a wide variety of peripheral devices (e.g., a peripheral device coupled via a universal serial bus (USB)). For example, as noted above, the machine 600 may correspond to any one of the compute service manager 104, the execution platform 110, and the devices 626 may include the data storage device 226 or any other computing device described herein as being in communication with the data platform 102 or the database storage 106.

The various memories (e.g., 606, 616, 632, and/or memory of the processor(s) 604 and/or the storage unit 618) may store one or more sets of instructions 602 and data structures (e.g., software) embodying or utilized by any one or more of the methodologies or functions described herein. These instructions 602, when executed by the processor(s) 604, cause various operations to implement the disclosed examples.

Described implementations of the subject matter can include one or more features, alone or in combination as illustrated below by way of example.

Example 1 is a method comprising: generating, by one or more processors, based on one or more input files, one or more input data columns, each input data column comprising an input value array of one or more input values; generating, by the one or more processors, based on the input data columns and one or more expressions, one or more result data columns, each result data column comprising one or more result value arrays and one or more result error indicator arrays; detecting, by the one or more processors, one or more projection errors during the generating of the one or more result data columns; storing, by the one or more processors, a result error indicator in the one or more error indicator arrays of the one or more result data columns, based on the one or more projection errors; generating, by the one or more processors, one or more filtered result data columns based on the one or more result data columns and the one or more result error indicator arrays of the one or more result data columns; and storing, by the one or more processors, the one or more filtered result data columns in a database of a data platform.

In Example 2, the subject matter of Example 1 includes, generating, by the one or more processors, file statistic data during the generating of the one or more input data columns.

In Example 3, the subject matter of any of Examples 1-2 includes, wherein: the one or more input data columns further comprise an error indicator array of one or more error indicators corresponding to the input value array, and the method further comprises: detecting, by the one or more processors, one or more input errors during the generating of the one or more input data columns; and storing, by the one or more processors, one or more input error indicators in the one or more error indicator arrays of the one or more input data columns based on the one or more input errors.

In Example 4, the subject matter of any of Examples 1-3 includes, wherein generating the one or more filtered result data columns comprises: deleting one or more rowsets of the one or more result value arrays of the one or more result data columns that correspond to a result error indicator stored on the one or more result error indicator arrays of the one or more result data columns.

In Example 5, the subject matter of any of Examples 1-4 includes, buffering, by the one or more processors, one or more errors in a local buffer; determining, by the one or more processors, an error percentage based on the one or more errors; and rejecting, by the one or more processors, the one or more input files based on the error percentage.

In Example 6, the subject matter of any of Examples 1-5 includes, buffering, by the one or more processors, one or more errors in a local buffer; determining, by the one or more processors, an error percentage based on the one or more errors; and accepting, by the one or more processors, the one or more input files based on the error percentage.

In Example 7, the subject matter of any of Examples 1-6 includes, responding, by the one or more processors, to an error based on a user preference.

In Example 8, the subject matter of any of Examples 1-7 includes, wherein responding to an error based on a user preference comprises aborting a load operation.

In Example 9, the subject matter of any of Examples 1-8 includes, wherein responding to an error based on a user preference comprises skipping an input file of the one or more input files when a number of errors meets a specified number.

In Example 10, the subject matter of any of Examples 1-9 includes, wherein responding to an error based on a user preference comprises skipping an input file of the one or more input files when a percentage of errors exceeds a specified percentage.

Example 11 is at least one machine-readable medium including instructions that, when executed by processing circuitry, cause the processing circuitry to perform operations to implement any of Examples 1-10.

Example 12 is an apparatus comprising means to implement any of Examples 1-10.

Example 13 is a system to implement any of Examples 1-10.

Example 14 is a method to implement any of Examples 1-10.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 636 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 636 or a portion of the network 636 may include a wireless or cellular network, and the coupling 630 may be a Code Division Multiple Access (CDMA) connection, a Global System for Mobile communications (GSM) connection, or another type of cellular or wireless coupling. In this example, the coupling 630 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 602 may be transmitted or received over the network 636 using a transmission medium via a network interface device (e.g., a network interface component included in the communication components 624) and utilizing any one of a number of well-known transfer protocols (e.g., hypertext transfer protocol (HTTP)). Similarly, the instructions 602 may be transmitted or received using a transmission medium via the coupling 628 (e.g., a peer-to-peer coupling) to the devices 626. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 602 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method comprising:
   parsing one or more input files to generate one or more input data columns during a copy operation to transfer data from the one or more input files to a database;
   performing one or more operations on the one or more input data columns to produce one or more result data columns;
   identifying one or more errors occurring during the performing of the one or more operations;
   recording the one or more errors in one or more error indicator arrays corresponding to the one or more result data columns;
   filtering the one or more result data columns based on the one or more error indicator arrays to generate one or more filtered result data columns; and
   storing the one or more filtered result data columns into the database.

2. The machine-implemented method of claim 1, further comprising generating file statistic data during the parsing of the one or more input files.

3. The machine-implemented method of claim 1, wherein the one or more input files comprise files in at least one of Comma Separated Value (CSV) format, JSON format, Parquet format, AVRO format, ORC format, or XML format.

4. The machine-implemented method of claim 1, further comprising:
   detecting one or more input errors during the parsing of the one or more input files; and
   storing one or more input error indicators in one or more input error indicator arrays associated with the one or more input data columns.

5. The machine-implemented method of claim 1, wherein filtering the one or more result data columns comprises deleting one or more rowsets of the one or more result data columns that correspond to an error indicator stored in the one or more error indicator arrays.

6. The machine-implemented method of claim 1, further comprising:
   buffering the one or more errors in a local buffer;
   determining an error percentage based on the one or more errors; and
   rejecting the one or more input files based on the error percentage.

7. The machine-implemented method of claim 1, further comprising:
   buffering the one or more errors in a local buffer;
   determining an error percentage based on the one or more errors; and
   accepting the one or more input files based on the error percentage.

8. The machine-implemented method of claim 1, further comprising responding to an error based on a user preference.

9. The machine-implemented method of claim 8, wherein responding to an error based on a user preference comprises aborting the copy operation.

10. The machine-implemented method of claim 8, wherein responding to an error based on a user preference comprises skipping an input file of the one or more input files based on a number of errors satisfying a threshold constraint.

11. A machine comprising:
   at least one processor; and
   at least one memory storing instructions that, when executed by the at least one processor, cause the machine to perform operations comprising:
   parsing one or more input files to generate one or more input data columns during a copy operation to transfer data from the one or more input files to a database;

performing one or more operations on the one or more input data columns to produce one or more result data columns;

identifying one or more errors occurring during the performing of the one or more operations;

recording the one or more errors in one or more error indicator arrays corresponding to the one or more result data columns;

filtering the one or more result data columns based on the one or more error indicator arrays to generate one or more filtered result data columns; and storing the one or more filtered result data columns into the database.

12. The machine of claim 11, wherein the operations further comprise generating file statistic data during the parsing of the one or more input files.

13. The machine of claim 11, wherein the one or more input files comprise files in at least one of Comma Separated Value (CSV) format, JSON format, Parquet format, AVRO format, ORC format, or XML format.

14. The machine of claim 11, wherein the operations further comprise:
   detecting one or more input errors during the parsing of the one or more input files; and
   storing one or more input error indicators in one or more input error indicator arrays associated with the one or more input data columns.

15. The machine of claim 11, wherein filtering the one or more result data columns comprises deleting one or more rowsets of the one or more result data columns that correspond to an error indicator stored in the one or more error indicator arrays.

16. The machine of claim 11, wherein the operations further comprise:
   buffering the one or more errors in a local buffer;
   determining an error percentage based on the one or more errors; and
   rejecting the one or more input files based on the error percentage.

17. The machine of claim 11, wherein the operations further comprise:
   buffering the one or more errors in a local buffer;
   determining an error percentage based on the one or more errors; and
   accepting the one or more input files based on the error percentage.

18. The machine of claim 11, wherein the operations further comprise responding to an error based on a user preference.

19. The machine of claim 18, wherein responding to an error based on a user preference comprises aborting the copy operation.

20. The machine of claim 18, wherein responding to an error based on a user preference comprises skipping an input file of the one or more input files based on a number of errors satisfying a threshold constraint.

21. A machine-storage medium storing instructions that, when executed by a machine, cause the machine to perform operations comprising:

parsing one or more input files to generate one or more input data columns during a copy operation to transfer data from the one or more input files to a database;

performing one or more operations on the one or more input data columns to produce one or more result data columns;

identifying one or more errors occurring during the performing of the one or more operations;

recording the one or more errors in one or more error indicator arrays corresponding to the one or more result data columns;

filtering the one or more result data columns based on the one or more error indicator arrays to generate one or more filtered result data columns; and storing the one or more filtered result data columns into the database.

22. The machine-storage medium of claim 21, wherein the operations further comprise generating file statistic data during the parsing of the one or more input files.

23. The machine-storage medium of claim 21, wherein the one or more input files comprise files in at least one of Comma Separated Value (CSV) format, JSON format, Parquet format, AVRO format, ORC format, or XML format.

24. The machine-storage medium of claim 21, wherein the operations further comprise:
   detecting one or more input errors during the parsing of the one or more input files; and
   storing one or more input error indicators in one or more input error indicator arrays associated with the one or more input data columns.

25. The machine-storage medium of claim 21, wherein filtering the one or more result data columns comprises deleting one or more rowsets of the one or more result data columns that correspond to an error indicator stored in the one or more error indicator arrays.

26. The machine-storage medium of claim 21, wherein the operations further comprise:
   buffering the one or more errors in a local buffer;
   determining an error percentage based on the one or more errors; and
   rejecting the one or more input files based on the error percentage.

27. The machine-storage medium of claim 21, wherein the operations further comprise:
   buffering the one or more errors in a local buffer;
   determining an error percentage based on the one or more errors; and
   accepting the one or more input files based on the error percentage.

28. The machine-storage medium of claim 21, wherein the operations further comprise responding to an error based on a user preference.

29. The machine-storage medium of claim 28, wherein responding to an error based on a user preference comprises aborting the copy operation.

30. The machine-storage medium of claim 28, wherein responding to an error based on a user preference comprises skipping an input file of the one or more input files based on a number of errors satisfying a threshold constraint.

* * * * *